United States Patent [19]

Nadeau

[11] Patent Number: 4,687,521

[45] Date of Patent: Aug. 18, 1987

[54] RANDOMLY INTERSTRATIFIED CLAYS

[75] Inventor: Paul H. Nadeau, Lewiston, Me.

[73] Assignee: National Research Development Corporation, London, England

[21] Appl. No.: 666,614

[22] Filed: Oct. 30, 1984

[30] Foreign Application Priority Data

Mar. 2, 1984 [GB] United Kingdom ............... 8405531

[51] Int. Cl.$^4$ .............................................. C04B 14/20
[52] U.S. Cl. ................................ 106/291; 106/288 B; 106/309; 106/DIG. 3
[58] Field of Search .................... 106/288 B, 291, 309, 106/DIG. 3, DIG. 4

[56] References Cited

U.S. PATENT DOCUMENTS

| | | | |
|---|---|---|---|
| 2,650,173 | 8/1953 | Goulding, Jr. ...................... | 427/336 |
| 3,252,757 | 5/1966 | Granquist ........................... | 423/328 |
| 3,510,331 | 5/1970 | Talvenheimo et al. .......... | 106/288 B |
| 3,674,521 | 7/1972 | Noble ................................. | 106/288 B |
| 3,701,417 | 10/1972 | Mercade ........................... | 106/288 B |
| 3,736,165 | 5/1973 | Sawyer, Jr. ....................... | 106/288 B |
| 3,737,333 | 6/1973 | Sawyer, Jr. ....................... | 106/288 B |
| 3,849,151 | 11/1974 | Abercrombie, Jr. ............... | 106/309 |
| 3,855,147 | 12/1974 | Granquist ......................... | 106/288 B |
| 4,053,324 | 10/1977 | Haden, Jr. et al. ............... | 106/288 B |
| 4,094,698 | 6/1978 | Thompson ........................ | 106/288 B |

FOREIGN PATENT DOCUMENTS

| | | |
|---|---|---|
| 1016385 | 1/1966 | United Kingdom . |
| 1054111 | 1/1967 | United Kingdom . |
| 1574954 | 9/1980 | United Kingdom . |
| 2025384 | 8/1982 | United Kingdom . |

OTHER PUBLICATIONS

G. F. Walker et al., Chemical Exfoliation of Vermiculite and the Production of Colloidal Dispersions, Science, vol. 156, Apr. 1967, pp. 385–387.
B. S. Neumann, Behavious of a Synthetic Clay in Pigment Dispersions, 1965, pp. 251–255.

*Primary Examiner*—A. Lionel Clingman
*Assistant Examiner*—Willie J. Thompson
*Attorney, Agent, or Firm*—Cushman, Darby & Cushman

[57] ABSTRACT

Randomly interstratified clay in synthesized by:

(i) saturating (replacing all the exchangeable cations of) a first clay with alkali metal ions (preferably $Na^+$ or $Li^+$), removing any excess alkali metal ions, and forming the saturated clay into a suspension containing no suspended particles exceeding $10^{-7}$ m equivalent spherical diameter, (ii) saturating a second clay with alkali metal ions (preferably $Na^+$ or $Li^+$), removing any excess alkali metal ions, and forming the saturated clay into a suspension containing no suspended particles exceeding $10^{-7}$ m equivalent spherical diameter, (iii) mixing the suspensions from (i) and (ii) to form a mixed suspension, and (iv) sedimenting and optionally drying the mixed suspension, the sediment being the synthetic randomly interstratified clay.

A wider range of synthetic clay compositions is thereby made available for use as catalysts, sorbents etc.

20 Claims, No Drawings

RANDOMLY INTERSTRATIFIED CLAYS

This invention relates to a method of synthesising randomly interstratified clays.

Clays have a layer silicate structure. In a pure clay, the layers are all the same. If two or more different kinds of layer occur within a sequence of layers, the clay is described as interstratified. If the sequence of the different layers is regular, for example as in certain naturally occurring deposits of K-rectorite (an interstratification of illite and smectite), the clay is known as regularly interstratified. If the sequence is random, the clay is randomly interstratified.

Clays are widely used in industry, for example as catalysts, catalytic supports, chemical supports, coagulants, sorbents and colloidal stabilisers. Generally, in industry, the best clay (or clay mixture) for a given purpose is determined not by systematic evaluations of every possible composition, but by selecting on a trial-and-error basis from whatever natural deposits happen to be available. This practice has persisted because of the difficulty or cost of hydrothermally or otherwise synthesising clays of compositions chosen at will. Simply mixing suspensions of two different clays has led to products which are merely segregated physical mixtures of the two starting clays.

According to the present invention, a randomly interstratified clay is synthesised by:

(i) saturating (replacing all the exchangeable cations of) a first clay with alkali metal ions (preferably $Na^+$ or $Li^+$), removing any excess alkali metal ions, and forming the saturated clay into a suspension containing no suspended particles exceeding $10^{-7}$ m equivalent spherical diameter, (ii) saturating a second clay with alkali metal ions (preferably $Na^+$ or $Li^+$), removing any excess alkali metal ions, and forming the saturated clay into a suspension containing no suspended particles exceeding $10^{-7}$ m equivalent spherical diameter, (iii) mixing the suspensions from (i) and (ii) to form a mixed suspension, and (iv) sedimenting and optionally drying the mixed suspension, the sediment being the synthetic randomly interstratified clay.

"Equivalent spherical diameter" refers to Stokes' Law about spherical bodies falling in fluids; the relative density of the particles is assumed to be 2.5.

After sedimenting and/or optional drying, the product may be saturated with any desirable cation.

This synthetic randomly interstratified clay will have in general the composition represented by the suspensions (i) and (ii) in their starting proportions. Some such compositions of synthetic clays will also be found in nature, but most will be entirely new. Furthermore suspension(s) (iii), . . . may be added (under corresponding conditions) to make three or more-component randomly interstratified clays, all of which except illite-chlorite-smectite and illite-smectite-vermiculite (we believe) are new products, not found in nature at all.

The invention extends to randomly interstratified clays of compositions unknown in nature.

New synthetic randomly interstratified clays include:

all compositions wherein one component (of the two or more) is ammonium mica or paragonite, and all compositions having three or more clay components except for the following which are known in nature: illite-chlorite-smectite and illite-smectite-vermiculite.

Preferably, the suspension (i) and/or (ii) and/or (iii) and/or the mixed suspension is ultrasonically vibrated, preferably for 1-2 minutes. Preferably, the clay concentration in the suspension (i) and/or (ii) and/or (iii) is from 0.2 to 10 g/l, more preferably from 0.2 to 5 g/l; synthetic hectorite is one clay stable in suspension at the higher concentrations.

Preferably, the mixed suspension at step (iii) has, or is adjusted to have, a total clay concentration of from 0.2 to 10 g/l, more preferably from 0.2 to 1 g/l.

The steps (i) and (ii) of saturating the clays are intended to involve disaggregation of the clay materials to completely dispersed individual free particles (the 'elementary' or 'fundamental' particles of the clay) in colloidal suspensions. In this form, with no large incompletely dispersed particles, the clays in suspension can be mixed to form colloidal products and the mixed suspensions can be dried to form randomly interstratified aggregate products of different layer types in varying proportions.

A 'fundamental' particle is defined as an individual or free particle which yields a single crystal pattern by electron diffraction.

An 'elementary' particle is a specific type of fundamental particle, examples of which are described below.

Three examples of clay materials which can be completely dispersed to elementary particles are:

(1) smectite, corresponding to single silicate (2:1) layers, the particles being 10 Å thick;

(2) rectorite, corresponding to two silicate (2:1) layers co-ordinated by a single plane of cations (i.e. $Na^+$, $NH_4^+$, or as in this case $K^+$), the particles being 20 Å thick; and (3) corrensite, corresponding to two silicate (2:1) layers co-ordinated by a single brucitic sheet, the particles being 24 Å thick. The 2:1 silicate layer is composed of 2 tetrahedral sheets and 1 octahedral sheet.

These particle thicknesses are determined by detailed transmission electron microscopy.

Smectite and vermiculite clays as well as clays with interstratification of illite, chlorite, kaolinite, ammonium-mica, paragonite or biotite layers with smectite and/or vermiculite layers may be used. Any mixture of two or more of these clays, in any proportions, may be used in this invention. The composition of the product may thus be selected at will. An exemplary product is randomly interstratified kaolinite:smectite.

The saturation may for example be accomplished by washing with 1-3M solutions of NaCl or LiCl. After saturation the excess ions can be removed by centrifugation, the solution being decanted and the clay resuspended with distilled or deionised water, but more preferably, to ensure quantitative retention of the dispersed material, the suspension containing the excess alkali metal ions is dialysed against distilled or deionised water. Most preferably of all, the saturation of the clay is achieved by using an alkali-metal-loaded cation exchange resin, whereby the step of removing excess alkali metal ions is avoided entirely.

Any suspended particles exceeding a $10^{-7}$ m equivalent spherical diameter may be removed from the completely dispersed particles by centrifugation. X-ray diffraction of the resulting sediment confirms that the clays are completely interstratified. Mixed suspensions made as above of smectite with rectorite, and smectite with corrensite, yield X-ray diffraction patterns identical to randomly interstratified illite-smectite and randomly interstratified chlorite-smectite respectively. The proportion of the layer types is determined by the relative amounts of the suspended components used to make the mixed suspension. Air drying of the mixed suspension on to a flat surface yields an aggregate product in the form of a film. Formation of the aggregate product may also be accomplished by freeze drying or spray drying. Sedimentation of the product from the mixed suspensions may also be accomplished by adding a flocculating agent.

The invention will now be described by way of example.

EXAMPLES 1-4

Aqueous suspensions were prepared of the smaller than $10^{-7}$ m fraction of $Na^+$-saturated smectite (Wyoming bentonite, Wards montmorillonite 25, John C. Lane tract, Upton, Wyo., USA) and smaller than $10^{-7}$ m $Na^+$-saturated K-rectorite (bentonite, Lab number MB235, Canon City, Colo., USA). The concentrations of the smectite and rectorite in the suspensions were 3.2 and 1.1 g/l respectively. The suspensions were mixed in solids weight ratios of the smectite to the rectorite of 1:1, 1:2, 1:4 and 1:8 (Examples 1, 2, 3 and 4). The mixed suspensions were dried on to glass slides, ethylene glycol solvated and analysed by X-ray diffraction. The diffraction maxima are identical to naturally occurring randomly interstratified illite-smectite with 90-50% smectite layers. In the table, S is smectite, I is illite, and 001, 002, 003, 004 and 005 are the crystallographic planes.

| Example | Ratio by weight smectite:rectorite | Interplanar spacings (in Å) as determined by X-ray diffraction maxima: experimental(theoretical) | | Percent expandable layers |
|---|---|---|---|---|
| | | S002/I001 | S003/I002 | |
| 1 | 1:1 | 8.60(8.59) | 5.60(5.60) | 90 |
| 2 | 1:2 | 8.86(8.81) | 5.54(5.53) | 70 |
| 3 | 1:4 | 9.01(9.03) | 5.42(5.45) | 55 |
| 4 | 1:8 | 9.09(9.14) | 5.39(5.41) | 50 |

EXAMPLES 5-7

Aqueous suspensions were prepared of the smaller than $10^{-7}$ m fraction of $Li^+$-saturated smectite (saponite from Ballarat, Calif., USA) and the smaller than $10^{-7}$ m fraction of $Li^+$-saturated corrensite (vein filling in dolerite from Hillhouse Quarry, Ayrshire, Scotland). The concentrations of the smectite and corrensite in suspension were both 0.4 g/l. The suspensions were mixed in weight ratios of the smectite to the corrensite of 2:1, 1:2 and 1:2 (Examples 5, 6 and 7). The mixed suspensions were subjected to 2 minutes' ultrasonic bath treatment. Sedimented aggregates of the mixed suspensions were prepared on glass slides, ethylene glycol solvated and analysed by X-ray diffraction. The diffraction maxima are identical to randomly interstratified chlorite-smectite with 90-55% smectite layers. (The abbreviations are as before. S is smectite and C is chlorite.)

| Example | Ratio by weight smectite:corrensite | Interplanar spacings (in Å) as determined by X-ray diffraction maxima: experimental(theoretical) | | Percent expandable layers |
|---|---|---|---|---|
| | | S002/C002 | S005/C004 | |
| 5 | 2:1 | 8.29(8.27) | 3.39(3.41) | 80 |
| 6 | 1:1 | 8.16(8.12) | 3.42(3.42) | 70 |
| 7 | 1:2 | 7.93(7.97) | 3.44(3.44) | 60 |

EXAMPLES 8-9

Aqueous suspensions of the rectorite and corrensite (previously described) were mixed in ratios by weight rectorite to corrensite 1:1, 3:1. Sedimented aggregates of the mixed suspensions were formed on glass slides, ethylene glycol solvated and analysed by X-ray diffraction. The maxima are identical to randomly interstratified smectite-illite-chlorite. (Abbreviations as before; S=smectite, I=illite, C=chlorite.)

| Example | Ratio by weight rectorite:corrensite | Interplanar spacings (in Å) as determined by X-ray diffraction maxima: experimental(theoretical) | Percent layers S:I:C |
|---|---|---|---|
| | | S005/I003/C004 | |
| 8 | 1:1 | 3.43(3.44) | 40:20:40 |
| 9 | 3:1 | 3.39(3.36) | 40:40:20 |

EXAMPLE 10

Aqueous suspensions of $Na^+$ saturated smectite (Wyoming bentonite) and rectorite (both previously described) were mixed in a ratio by weight of smectite to rectorite 1:2. The concentration of total clay in the mixed suspension was diluted with distilled water to 1 g/l. The mixed suspension was subjected to ultrasonic bath treatment for 2 minutes. A sedimented aggregate was prepared on to a glass slide, ethylene glycol solvated and analysed by X-ray diffraction. The diffraction maxima are identical to a randomly interstratified illite-smectite, 75% smectite layers. (Abbreviations as before.)

| Example | Ratio by weight smectite-rectorite | Interplanar spacings (in Å) as determined by X-ray diffraction maxima: experimental(theoretical) | | Percent expandable layers |
|---|---|---|---|---|
| | | S002/I001 | S003/I002 | |
| 10 | 1:2 | 8.75(8.75) | 5.55(5.55) | 75 |

In further experiments (not described in detail) suspensions of $Li^+$-saturated Wyoming bentonite and corrensite and $Na^+$-saturated Wyoming bentonite and corrensite yielded comparable results.

EXAMPLES 11-15

Aqueous suspensions were prepared of:
(i) the smaller than $10^{-7}$ m fraction of $Li^+$-saturated smectites (Wyoming bentonite, previously described) at 4.6 g/l;
(ii) synthetic hectorite (a smectite prepared as described in Newmann, B. S., 1965, Rheol. Acta Vol. 4, page 250 and British Pat. No. 1054111, obtained from Laporte Industries under the trade name Laponite) at 10 g/l; and (iii) the smaller than $10^{-7}$ m Na$^+$-saturated naturally occurring randomly interstratified kaolinite-smectite (75% kaolinite layers (i.e. 25% expandable layers), from Tepakan, Campeche, Mexico) at 5.8 g/l.

Suspensions of (i) and (iii) were mixed in solids weight ratios of 4:1 and 2:1 (Examples 11 and 12). Suspensions of (ii) and (iii) were mixed in solids weight ratios of 1:1, 1:2 and 1:4 (Examples 13, 14 and 15). The five mixed suspensions were each subjected to 1 minute's ultrasonic bath treatment. Sedimented aggregates of the mixed suspensions were prepared on glass slides, ethylene glycol solvated and analysed by X-ray diffraction. The diffraction maxima are identical to randomly interstratified kaolinite-smectite with 95–40% smectite layers. (The abbreviations are as before. S is smectite and K is kaolinite).

| Example | Ratio by weight smectite:kaolinite-smectite | Interplanar spacings (in Å) as determined by X-ray diffraction maxima: experimental(theoretical) | Percent expandable layers |
|---|---|---|---|
|  |  | S005/K002 |  |
| 11 | 4:1 | 3.386(3.385) | 95 |
| 12 | 2:1 | 3.390(3.390) | 85 |
|  |  | S002/K001 |  |
| 13 | 1:1 | 8.36(8.36) | 75 |
| 14 | 1:2 | 8.09(8.13) | 50 |
| 15 | 1:4 | 7.97(8.01) | 40 |

EXAMPLES 16–18

Aqueous suspensions were prepared of the smaller than $10^{-7}$ m fraction of Li$^+$-saturated smectite (Wyoming bentonite, previously described) and of Na$^+$-saturated naturally occurring regularly interstratified illite-smectite (70% illite layers) (laboratory number MB912 from Los Piedras, Colo., USA). The concentration of the interstratified illite-smectite was 2.7 g/l. The suspensions were mixed in ratios by weight of smectite to interstratified illite-smectite of 1:1, 1:2 and 1:3 (Examples 16, 17 and 18). The mixed suspensions were treated and analysed in the same manner as those of Example 11–15. The diffraction maxima are identical to randomly interstratified illite-smectite with 90–55% smectite layers. (The abbreviations are as before.)

| Example | Ratio by weight smectite illite-smectite | Interplanar spacings (in Å) as determined by X-ray diffraction maxima: experimental(theoretical) | | Percent expandable layers |
|---|---|---|---|---|
|  |  | S002/I001 | S003/I002 |  |
| 16 | 1:1 | 8.60(8.59) | 5.61(5.60) | 90 |
| 17 | 1.2 | 8.86(8.81) | 5.54(5.53) | 70 |
| 18 | 1.3 | 9.01(8.90) | 5.51(5.50) | 60 |

EXAMPLES 19–21

Aqueous suspensions were prepared of the smaller than $10^{-7}$ m fraction of Li$^+$-saturated Wyoming bentonite (previously described) and of Na$^+$-saturated synthetic interstratified ammonium-mica-smectite (60% ammonium-mica layers) (made as described in U.S. Pat. No. 3,252,757). The concentration of the interstratified ammonium-mica-smectite was 5.7 g/l. The suspensions were mixed in weight ratios of the smectite to the interstratified ammonium mica-smectite of 1:1, 1:2 and 1:3 (Examples 19, 20 and 21). The mixed suspensions were treated and analysed in the same manner as those of Examples 11–15. The diffraction maxima are identical to randomly interstratified ammonium-mica-smectite, 90–70% smectite layers. (The abbreviations are as before M is ammonium-mica.)

| Example | Ratio by weight smectite:ammonium-mica-smectite | Interplanar spacings (in Å) as determined by X-ray diffraction maxima: experimental(theoretical) S003/M002 | Percent expandable layers |
|---|---|---|---|
| 19 | 1:1 | 5.59(5.60) | 90 |
| 20 | 1:2 | 5.57(5.57) | 80 |
| 21 | 1:3 | 5.53(5.53) | 70 |

EXAMPLE 22

Aqueous suspensions were prepared of the Li$^+$-saturated smaller than $10^{-7}$ fraction of hydrobiotite (regularly interstratified biotite-vermiculite, 25% biotite layers) and of vermiculite, both of which had undergone treatment with large organic cations to cause gross expansion between the 2:1 silicate layers (Walker, G. F., 'Science' Vol. 156, pp. 385–387 (1967) and British Pat. No. 1016385). The concentrations of hydrobiotite and vermiculite in the suspensions were 2.25 and 0.1 g/l respectively. The suspensions were mixed in a weight ratio of the vermiculite to hydrobiotite of 1:2. The mixed suspension was subjected to 1 minute's ultrasonic bath treatment. Because X-ray identification of vermiculite is routinely based on its interplanar spacing in the Mg$^{2+}$-saturated form (14.3 Å), the clay materials in the mixed suspension were Mg$^{2+}$-saturated. A sedimented aggregate of the Mg$^{2+}$-saturated mixed suspension was prepared onto a glass slide and analysed by X-ray diffraction. The diffraction maxima are identical to randomly interstratified biotite-vermiculite with 90% vermiculite layers. (Abbreviations are as before. B is biotite, V is vermiculite.)

| Example | Ratio by weight vermiculite:hydrobiotite | Interplanar spacings (in Å) as determined by X-ray diffraction maxima: experimental(theoretical) | | Percent expandable layers |
|---|---|---|---|---|
|  |  | V001/B001 | V004/B003 |  |
| 22 | 1:2 | 14.2(14.2) | 3.57(3.57) | 90 |

EXAMPLE 23

This Example demonstrates that dispersed microcrystalline and amorphous material can be combined with completely dispersed clay particles. Aqueous suspensions were prepared of:

(i) the smaller than $10^{-7}$ m fraction of Li$^+$-saturated smectite (being synthetic hectorite (previously described)) and (ii) proto-imogolite (Farmer, V. C., British Pat. Nos. 1574954 and 2025384.)

The suspensions were mixed in a weight ratio of the smectite to the proto-imogolite of 1:1. The mixed suspension was subjected to 1 minute's ultrasonic bath treatment. A sedimented aggregate of the mixed suspension was prepared onto a glass slide and heated to 300° C. for 2 hours; a sedimented aggregate of the synthetic hectorite alone was also heated to 300° C. for 2 hours for comparison. Both were analysed by X-ray diffraction. The X-ray diffraction maxima show the sedimented aggregate made from the mixed suspension to have a random range of spacings from 10.5 Å up to an undetermined upper limit (greater than 34 Å), whereas the smectite layers of the sedimented aggregate made from the suspension of synthetic hectorite alone collapsed to a more uniform spacing of 9.78 Å. The results demonstrate that the dispersed amorphous proto-imogolite particles have become randomly interposed between the clay smectite layers.

EXAMPLE 24

Aqueous suspensions were prepared of the $Na^+$-saturated smaller than $10^{-7}$ m fractions of rectorite from Baluchistan, Pakistan (regularly interstratified paragonite-smectite, 50% paragonite layers) and of Wyoming bentonite (previously described), the concentration of the rectorite suspension being 2.4 g/l. The mixed suspension was subjected to 1 minute's ultrasonic bath treatment. A sedimented aggregate of the mixed suspension was prepared onto a glass slide, ethylene glycol solvated and analysed by X-ray diffraction. The diffraction maxima are identical to a randomly interstratified paragonite-smectite with 90% smectite layers. (The abbreviations are as before. P=paragonite and S=smectite.)

| Example | Ratio by weight rectorite-smectite | Interplanar spacings (in Å) as determined by X-ray diffraction maxima: experimental(theoretical) S002/P001 | S003/P002 | Percent expandable layers |
|---|---|---|---|---|
| 24 | 1:1 | 8.59(8.60) | 5.64(5.59) | 90 |

NOTE: All theoretical X-ray diffraction values are taken from Reynolds, R. C., Interstratified Clay Minerals, Chapter 4 (pp 249–303) in Crystal Structures of Clay Minerals and their X-ray Identification, edited by G. Brindley and G. Brown, Monograph 5, Mineralogical Society, London, 1980. Although the invention has been demonstrated primarily for conventional interstratified clays, the invention is applicable to any two or more of the dispersed clay minerals.

What is claimed is:

1. A method of synthesising a randomly interstratified clay, comprising:
   (i) saturating (replacing all the exchangeable cations of) a first clay with alkali metal ions, removing any excess alkali metal ions, and forming the saturated clay into a suspension containing no suspended particles exceeding $10^{-7}$ m equivalent spherical diameter,
   (ii) saturating a second clay, which is a different clay from said first clay, with alkali metal ions, removing any excess alkali metal ions, and forming the saturated clay into a suspension containing no suspended particles exceeding $10^{-7}$ m equivalent spherical diameter,
   (iii) mixing the suspensions from (i) and (ii) to form a mixed suspension, and
   (iv) sedimenting the mixed suspension, the sediment being the synthetic randomly interstratified clay.

2. The method of claim 1, wherein the alkali metal ions with which the first clay is saturated are selected from $Na^+$ and $Li^+$.

3. The method of claim 2, wherein the alkali metal ions with which the second clay is saturated are selected from $Na^+$ and $Li^+$.

4. The method of claim 1, further comprising drying the sedimented mixed suspension.

5. The method of claim 1, wherein the sedimentation of the product from the mixed suspension is accomplished by adding a flocculating agent.

6. The method of claim 1, further comprising saturating the sediment (which may be dried) with a cation.

7. The method of claim 1, further comprising saturating at least a third clay and forming the third and any further clay each of which, including said third clay, is a different clay from said first and second clay, into a suspension in like manner as the first and second clays, and mixing the third and any further suspension with the first two suspensions.

8. The method of claim 1, wherein at least one of said suspensions is ultrasonically vibrated.

9. The method of claim 1, wherein the clay concentration in at least one of said suspensions before mixing is from 0.2 to 10 g/l.

10. The method of claim 9, wherein the clay concentration is at least one of said suspensions before mixing is from 0.2 to 5 g/l.

11. The method of claim 1, wherein the mixed suspension has, after adjustment if necessary, a total clay concentration of from 0.2 to 10 g/l.

12. The method of claim 11, wherein the mixed suspension has, after adjustment if necessary, a total clay concentration of from 0.2 to 1 g/l.

13. The method of claim 1, wherein the component clays include at least one of smectite, illite, paragonite, chlorite, kaolinite, ammonium-mica, biotite and vermiculite.

14. A randomly interstratified clay containing at least one of ammonium-saturated mica and paragonite.

15. A randomly interstratified clay containing at least three different clay components, disclaiming illite-chlorite-smectite and illite-smectite-vermiculite.

16. A film, comprising a clay according to claim 14, made by drying a mixed suspension of clays on a surface.

17. A method comprising
   (i) saturating (replacing all the exchangeable cations of) a first clay which is either fully expandable or contains an expandable component, with alkali metal ions, removing any excess alkali metal ions, and forming the saturated clay into a suspension containing no suspended particles exceeding $10^{-7}$ m equivalent spherical diameter,
   (ii) seperately or together saturating a second clay, which is a different clay from said first clay and which is either fully expandable or contains an expandable component, with alkali metal ions, removing any excess alkali metal ions, and forming the saturated clay into a suspension containing no suspended particles exceeding $10^{-7}$ m equivalent spherical diameter,
   (iii) forming a mixed suspension from the suspensions from (i) and (ii); and
   (iv) drying the mixed suspension on the surface.

18. The method of claim 1, wherein in the course of conducting steps (i) and (ii), said removing is accomplished by dialysis.

19. The method of claim 1, wherein any suspended particles exceeding $10^{-7}$ m equivalent spherical diameter are removed in steps (i) and (ii) by centrifugation.

20. A method of making a film on a surface, comprising:

(i) saturating (replacing all the exchangeable cations of) a first clay which contains an expandable component, with alkali metal ions, removing any excess alkali metal ions, and forming the saturated clay into a suspension containing no suspended particles exceeding $10^{-7}$ m equivalent spherical diameter, (ii) saturating a second clay which is a different clay from said first clay and which contains an expandable component, with alkali metal ions, removing any excess alkali metal ions, and forming the saturated clay into a suspension containing no suspended particles exceeding $10^{-7}$ m equivalent spherical diameter, (iii) forming a mixed suspension from the suspensions from (i) and (ii), and (iv) applying said mixed suspension on said surface and drying said mixed suspension thereon as a film.

* * * * *